Oct. 3, 1933.  E. VIGEANT  1,929,223
DOOR LOCKING ARRANGEMENT
Filed March 16, 1932  2 Sheets-Sheet 1
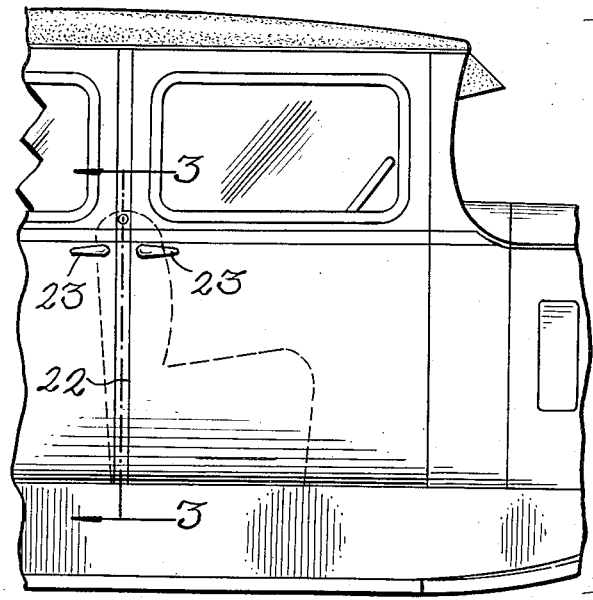
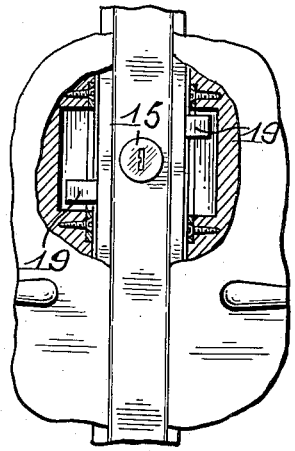
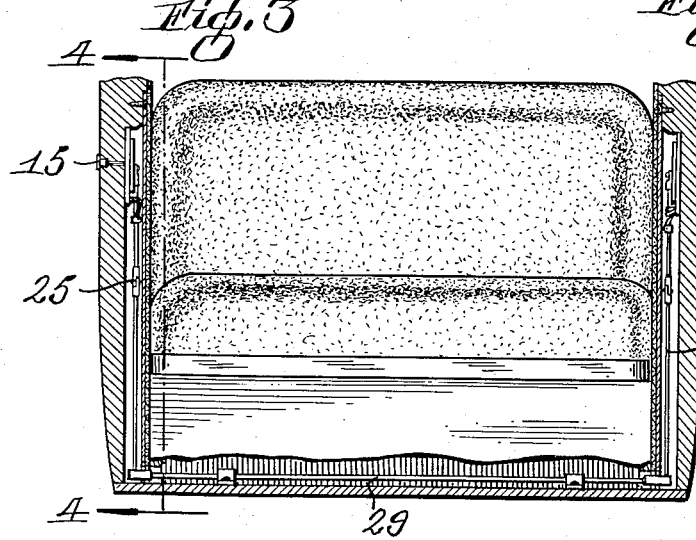
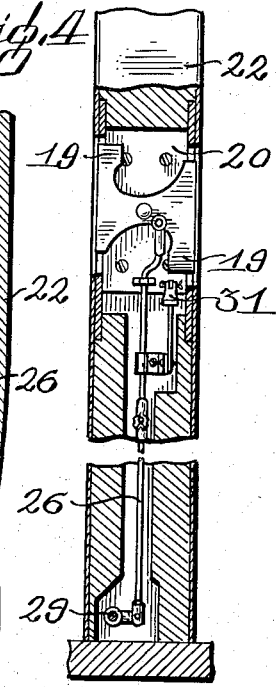
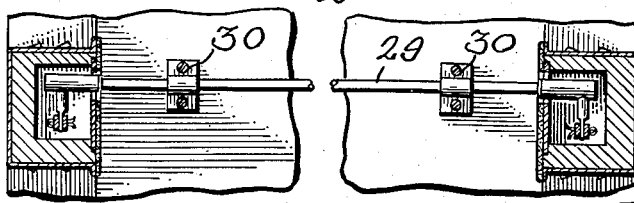
Inventor
Ernest Vigeant
By Marion V. Marier
Attorneys Oct. 3, 1933.　　　E. VIGEANT　　　1,929,223
DOOR LOCKING ARRANGEMENT
Filed March 16, 1932　　2 Sheets-Sheet 2
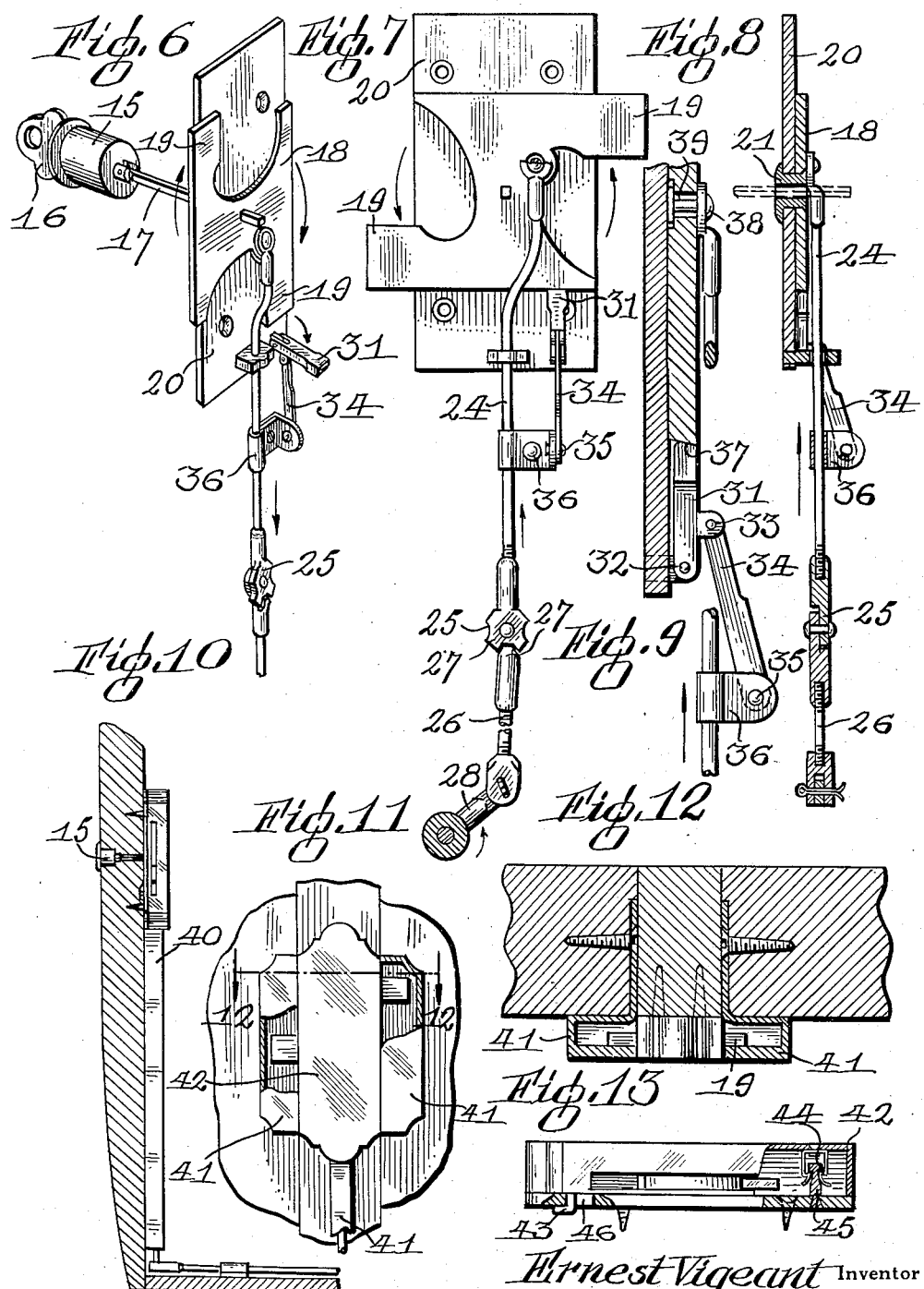

Patented Oct. 3, 1933

1,929,223

UNITED STATES PATENT OFFICE 1,929,223

DOOR LOCKING ARRANGEMENT

Ernest Vigeant, Montreal, Quebec, Canada

Application March 16, 1932. Serial No. 599,232

1 Claim. (Cl. 70—14)

The present invention relates to a door locking arrangement and is an improvement over my United States Patent application No. 425,038 filed January 31st, 1930.

In said patent application, a locking device is disclosed which is actuated by a lock and flexible connections transmitting movement of the main locking bolt to a second bolt; said second bolt being urged in inoperative position by a spring.

Although this arrangement is admirably adapted to the needs of modern automobile owners and drivers, in providing an easy and expeditious way of locking their cars, nevertheless it presents certain minor drawbacks which are avoided by the new device object of the present invention.

For instance, the fact that the connections between two locking bolts (one for each side of an automobile) are flexible necessitates the use of a spring to retract one of said bolts when the other is similarly retracted manually. Inasmuch as the flexible connections are trained over pulleys, to follow the contour of the automobile body, it is imperative to provide exact adjustment of the whole mechanism to avoid frictional losses causing dragging and uneven operation.

The present invention eliminates the above defects in a simple manner and furthermore provides for additional features absent in the original conception.

Consequently, the prime object of the present invention resides in the provision of a locking mechanism for closed automobiles, which is positive in action, simple and unaffected by the distortions imparted to the automobile body by stresses caused during driving over uneven roads or otherwise.

Another important object of the invention comprises the provision of means for automatically locking the actuating bolts of the system in such a manner that operation thereof by means of a flat tool is impossible.

Other objects and advantages of the invention will be disclosed or become apparent as the description progresses.

As an example, and for purposes of illustration, a preferred embodiment of the invention is shown in the attached drawings wherein;

Figure 1 is an elevation view of a motor vehicle having the locking mechanism installed thereon and showing the general position of the lock with respect to the doors, Figure 2 is an enlarged view of the lock with an inside view of the locking bolts, Figure 3 is a view taken on line 3—3 of Figure 2, Figure 4 is a view on line 4—4 of Figure 3 and showing the arrangement of the locking system in the vehicle body, Figure 5 is a plan view of the link mechanism on the floor of the vehicle, Figure 6 is a perspective view of the operatitng end of the locking mechanism;

Figure 7 is an elevational detail view of Figure 6,

Figure 8 is a side view of same,

Figure 9 is an enlarged detail view of Figure 8,

Figure 10 is a view similar to that enclosed in lines 4—4 of Figure 3, but showing a modified construction, Figure 11 is a view similar to Fig. 2, from the inside, of said modified construction, Figure 12 is a view taken on lines 12—12 of Fig. 11, and Figure 13 is a view showing the method for securing the lock cover depicted in Figure 11.

I will now proceed to describe the invention, having reference to the appended drawings wherein similar numerals represent corresponding parts throughout the same.

As shown in Figure 1, the invention is applied to a motor vehicle known as sedan or having four doors. Evidently, the invention is also applicable to vehicles having only two doors, such as coupés, "coaches" and the like. In this last case, however, only one door on each side of the vehicle can be locked and, consequently, the mechanism will be correspondingly simpler.

Referring to Figure 1, it is seen that the operating lock is located on the body post separating the doors of a vehicle, and adjacent the door handles; in the case of coupés and the like, the lock is disposed on the body side at a convenient location and near the door.

Referring now to Figure 6 illustrating the mechanism proper, 15 is a lock of conventional barrel type actuated by a key 16. This lock is adapted to operate, by means of a square rod 17, a rotatable member 18 comprising a pair of diametrally opposed bolts 19. This rotatable member 18 is rotatably supported on to a base plate 20 to which it is pivoted by means of a rivet 21 shown in Figure 8.

As shown to advantage in Figures 3 and 4, this base plate 20 is adapted to be secured in a recessed portion of the door post, indicated on the drawings by the numeral 22, and adjacent the handles 23 of the vehicle doors. Each side of the vehicle therefore comprises, recessed in the said door posts, a base plate 20 permanently secured thereon by bolts or otherwise. Inasmuch as operation of the locking mechanism is controlled centrally by means of the lock 15, it is evident that connecting means must exist between each side of the vehicle to actuate the rotatable member 18 carrying the bolts 19 effectuating the locking of the doors. To that effect, a link 24 is secured to the member 18 at a short distance from the centre thereof and consequently acts as a connecting rod secured to an imaginary crank comprised between the axis of rotation and the connection of 24 with 18. Therefore, whenever 18 is rotated by means of the lock 15, the link 24 will be actuated, and in the present case, will move upwardly whenever 18 is rotated anti-clockwise to lock the doors.

Since the sides of modern motor vehicles are generally curved, means are provided to permit the transmission of movement without bending the links, although the connecting mechanism at each side of the vehicle may follow a curved path. For this purpose, a pivoted joint 25 is provided between the link 24 of the rotatable member and a second lower link 26 extending to the floor of the vehicle.

As shown clearly in Figures 6 and 7, this pivoted joint 25 comprises stops 27 limiting the movement of the lower link 26 and thus permitting positive transfer of movement from 24 to 26 and at the same time enabling suitable freedom whenever this combined linkage has to follow the curved sides of an automobile.

Connecting each lower link 26, on each side of the vehicle, a crank 28 is provided which is rigidly secured to a transverse shaft 29 journalled on the floor of the vehicle by means of the bearings 30. Thus, from the combined apparatus already described, it is clear that movement imparted to the rotating member 18 by means of the lock 15, and further transmitted to the first link 24, will be reproduced with fidelity by the rotating member situated on the opposite side of the vehicle and through the instrumentality of the linking mechanism already described.

In order that unauthorized actuation of the rotatable member 18 be prevented, other than through the lock 15, and by means of a flat tool inserted between the door and the door post, an additional locking device is provided which comprises a pivoted dog 31. Said dog is fulcrumed at 32 to each base plate 20 and is provided with an ear to which a pivoted link 34 is secured. Said link 34 is in turn pivoted at 35 to a bracket 36 secured to the link 24.

An examination of Figure 6 will clearly indicate that whenever 24 is moved upwardly or downwardly, the dog 31 will be either moved to a vertical or horizontal position. Whenever the member 18 is rotated into door locking position, the bolts 19 projecting from the edge of the base plate 20 and the dog 31 will be moved to a vertical position and caused to lie against said base plate just under the marginal edge of member 18. As clearly shown in Figure 9, said edge of the base plate and the upper edge 37 of the dog are bevelled so that whenever a pressure is exerted on one bolt 19 to rotate the member 18 in a clockwise direction, the said dog will be forced against the base plate and thus positively prevent rotatable movement of said member.

Due to the fact that the movement of the dog 31 is controlled directly by the link 24, which is dependent on the member 18, it is imperative that a slight play exist between the member 18 and the link 24. For that purpose, the rivet 38 securing 24 to 18 is slightly smaller in diameter than the aperture through which it is inserted; consequently, a gap shown at 39 (Figure 9) is thus provided to make sure that after the member 18 has been rotated anti-clockwise, to lock the doors, said member 18 cannot be rotated in a clockwise direction by means of a flat tool. Due to this play between the member 18 and the link 24, movement imparted to 18 will move the same against the upper edge of the dog 31 without transmitting this movement to the link 24; therefore, it is clear that the dog 31 cannot be actuated at the same time and will remain in locking position.

A modification of the invention is shown in Figures 10 to 13 wherein the device is applied to an existing vehicle without in any way altering the structure thereof and by means of mechanism inserted in a concealing conduit 40. The actuating mechanism proper is exactly the same as that already disclosed with the difference that the bolt receiving sockets 41 are disposed on the inner side of the doors instead of within the thickness of said doors, as shown in Figure 2. To insure the utmost protection against unauthorized actuation of the rotatable member 18, a bolt cover 42 is provided comprising a hook 43 at one end thereof and a snap spring 44 at the other end. Figure 13 discloses this arrangement wherein a post 45, secured to the base plate 20, is recessed towards the upper end thereof whereby to engage the two arms of the snap spring 44 already mentioned. To secure this cover 42 in place, it is only necessary to insert the hook 43 in a convenient aperture 46 provided in the base and to press on the cover until the two arms of the snap spring 44 are securely engaged under the enlarged portion of the post 45, whereby removal of this cover is impossible without breaking the spring.

From the foregoing, it will be readily understood that the present device comprises an effective and simple way of locking simultaneously all the doors of a motor vehicle and to render the same proof against unauthorized operation thereof.

It is to be understood that the form of my invention herein shown and described is to be taken as a preferred example of the same, and that various changes as to the shape, size and arrangement of parts may be resorted to without departing from the spirit of the invention or the scope of the subjoined claim.

Having thus described my invention, I claim:—

In a device for simultaneously locking the doors of an automobile from a central point, and including rotatable bolt members, one for each door, links fulcrumed eccentrically to the members with respect to their pivotal centres, and actuating means for the links operable from a common key operated lock, the combination therewith of a pivoted dog for each member pivotally secured to a fixed plate to which the members are fixed, and a short link connected to the bolt member link adapted to move said dog to a position below one edge of the said member, whereby unauthorized movement of the member so locked is prevented, in a direction opposite to that imparted to the bolt member after manipulation of the lock with a suitable key.

ERNEST VIGEANT.